United States Patent

[11] 3,609,190

[72] Inventors Lucien Sobel
Grenoble;
Ludovic Parvi, Pont de Claix, both of France
[21] Appl. No. 685,306
[22] Filed Nov. 24, 1967
[45] Patented Sept. 28, 1971
[73] Assignee Ugine Kuhlman
Paris, France
Continuation-in-part of application Ser. No. 424,848, Jan. 11, 1965, now abandoned.

[54] POLYAMINATED DERIVATIVES OF POLYCHLOROPOLYPHENYLBENZENES
1 Claim, No Drawings

[52] U.S. Cl.................................................... 260/570.5,
252/8.1, 260/45.9, 260/453 AR, 260/518, 260/571, 260/573, 260/576
[51] Int. Cl........................................................ C07c 91/42
[50] Field of Search............................................ 260/570.5, 571, 573, 576

[56] References Cited
UNITED STATES PATENTS

| | | | |
|---|---|---|---|
| 2,573,607 | 10/1951 | Rieveschl, Jr. ............... | 260/576 |
| 3,164,634 | 1/1965 | Bremmer...................... | 260/570.5 |
| 3,308,158 | 3/1967 | Szobel et al.................. | 260/570.5 |

FOREIGN PATENTS

| 1,090,229 | 10/1960 | Germany...................... | 260/573 |

OTHER REFERENCES

Carlin, et al., " Anomalous Ullmann Reactions. The Unsymmetrical Coupling of 2,6-Dibromo-4-nitroidobenzene, J. Am. Chem. Soc., Vol. 77, 1955, pages. 966, 971.

*Primary Examiner*—Charles B. Parker
*Assistant Examiner*—Charles F. Warren
*Attorney*—Webb, Burden, Robinson & Webb ABSTRACT: A polyaminated derivative of polychlorinated polyphenylbenzenes higher than diphenyl, useful as an anti-ignition additive in polymer-type materials such as polyesters and having a general formula:

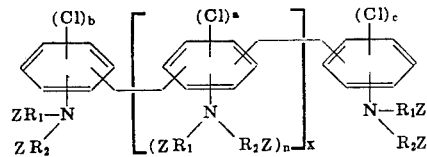

prepared at a temperature between 70° and 300° C. by the reaction of an aminated compound containing members $R_1Z$ and $R_2Z$ with at least one polyhalogenated polyphenylbenzene $R_1Z$ and $R_2Z$ are members selected from the group consisting of an atom of hydrogen and a functional group formed by a radical $R_1$ and $R_2$ and by a terminal group Z, said radicals $R_1$ and $R_2$ being selected from the group consisting of a saturated aliphatic having from two to eight carbon atoms and an aromatic, said terminal group Z being a member selected from the group consisting of —OH, —$NH_2$, $CH_3$.

POLYAMINATED DERIVATIVES OF POLYCHLOROPOLYPHENYLBENZENES

This application is a continuation-in-part of our copending application, Ser. No. 424,848, filed Jan. 11, 1965, entitled "-Polyaminated Derivatives of Polychloropolyphenylbenzenes," now abandoned.

This invention relates to novel industrial products formed by polyaminated derivatives of polyhalogenated polyphenylbenzenes higher than diphenyl wherein the benzene rings may or may not be coaxial. These derivatives have the following general formula:

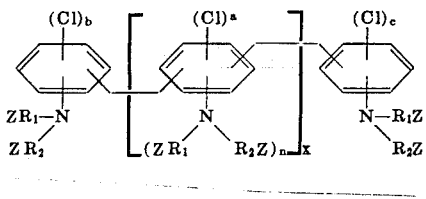

in which:
N is a member selected from the group consisting of a primary, secondary and tertiary amine function fixed on a ring; $R_1Z$ and $R_2Z$ are members selected from the group consisting of an atom of hydrogen, a functional group formed by a radical $R_1$ or $R_2$ and by a terminal group Z. The radicals $R_1$ and $R_2$ may be selected from the group consisting of a saturated aliphatic having from two to eight carbon atoms, aromatic radical, and the terminal group Z may be selected from the group consisting of—OH,—$NH_2$, and—$CH_3$;

$x$ is an integer equal to at least 1;

$a, b, c$ represent the number of chlorine atoms fixed on each of the rings; and being at least 1 and not more than 4; and $n$ is equal to either 0 or 1.

The selection of $R_1$ and $R_2$, which radicals may be identical, can be saturated aliphatic radicals having from two to eight carbon atoms, for example, by condensing polychlorinated polyphenylbenzenes with monoethanolamine, ethylene diamine, etc. The selection may also be an aromatic radical, for example, by condensing polychlorinated polyphenylbenzenes with 1,4-napthylene diamine, 9,10-anthracene diamine, methaphenylene diamine, 4-chlorophenylene 1,2-diamine, N,N'-dimethyl 4-chloro 1,2-phenylene diamine, benzidine, N,N'-diethylbenzidine, N,N'-dimethylbenzidine, 2,2'-dichloro 3,3'-dimethylbenzidine, 2,2'-dimethylbenzidine, 2-chlorobenzidine, 2,6-2',6'-tetrabromobenzidine, 2-nitrobenzidine, 4-bromo 1,2-diaminonaphthalene, 1,5-diamino naphthalene, 3,4-diamino 1-methyl naphthalene, 4,4'-diamino diphenylmethane, toluylene diamine, etc.

Since it is also possible to select both $R_1$ and $R_2$ and the terminal group Z, it is possible to obtain a polyfunctional product and, therefore, to obtain polyfunctional polyhalogenated polyphenylbenzenes. These products may be employed in the production of polyethers, polyesters, polyamides, isocyanates, etc. They may also form epoxy resin hardeners or catalysts, plasticizers, modifiers or adjuvants for plastic materials.

The products in which the polyaminated derivatives of the invention form an ingredient possess the properties that they are difficult to ignite and that they are self-extinguishing when the chlorine content is adequate. Starting from isocyanates and products such as polyethers and polyesters which may be prepared from the polyaminated derivatives according to the invention, we obtain an entire range of polyurethanes that are highly flame resistant.

The products in which Z represents an amine group form interesting hardeners for epoxy resins, for example, cured products that are anti-ignition and self-extinguishing due to their highly chlorinated molecule. These same products are compatible with halogenated plastic materials such as polyvinyl chloride, polyvinylidene chloride and their copolymers and act as stabilizers for these resins due to their faculty for fixing the hydrochloric acid released during aging of these materials.

The products in which Z is a hydroxyl or carboxyl group may be employed as a raw material for production of polyesters which are difficult to ignite and even self-extinguishing. Being compatible with styrene, as well as with the conventional diacids customarily intervening in the production of polyesters (such as succinic, maleic, phtalic and adipic acids), and with the dialcohols employed for the same purpose (such as glycols), and with the actual polyesters and polyethers, they may be employed alone or in mixture with these different kinds of products in order to improve their resistance to inflammation and to endow them with specific properties.

Where $R_1$ and/or $R_2$ represent a radical containing unsaturated carbon atoms, Z being apt to be formed by a hydroxyl or carboxyl group, for example, the double band offers a wide possibility for creating novel molecules.

The various applications which have been listed are not limitative but indicated the great possibilities conferred by the polyaminated derivatives of polyphenylbenzenes according to the invention.

The novel products according to the invention are obtained by causing reaction under strong agitation between an aminated or amino compound containing the radicals $R_1Z$ and/or $R_2Z$ and one or more polyhalogenated polyphenylbenzenes.

The reaction is performed either within the amine itself or within the solution of this amine in water, or in another inert solvent.

The reaction temperature essentially depends on the amine brought into action, and is between 70° and 300° C. For the majority of the amines selected, it falls between 100° and 200° C. The pressure used also depends on the nature of the amine brought into action. It may be lower than, equal to, or higher than atmospheric pressure, according to specific requirements. Use of catalysts is advantageous for certain amines, and salts of iron or of copper are employed for this purpose. Generally, the operating conditions used are those which affect the reaction of the amine group with the chlorine linked to the ring. An excess of amino compound in comparison with stoichiometrical quantity may be advantageously employed.

After the reaction, the resulting mixture is processed to separate the product formed and contingently to recover the solvent according to known methods. For example, where the solvent is soluble in water, which is the general rule for amines employed as solvents, the mixture resulting from the reaction is poured into a quantity of water needed to precipitate the polyaminated derivative of the one or more polyhalogenated polyphenylbenzenes brought into action. The derivative is generally insoluble or has a low solubility under these conditions. In other cases, the derivative is separated by distillation or by any other conventional method.

The polyhalogenated polyphenylbenzenes may be formed according to the position of the phenyl radicals relative to each other, as well as of their various isomers, whether they are employed alone or intermixed.

On the other hand, we have observed that certain aromatic amines of relatively low basicity must be condensed at high temperatures (about 250° C.) and for rather long times. Under these conditions, amines in the presence of hydrochloric acid, liberated by condensation, tend to be decomposed. The use of an excess amine, which might fix HCl and thus ensure the reactional conditions without any decomposition, is not entirely satisfactory; in fact, because of their low basicity, these amines fix HCl too slowly.

We have found that the presence of a moderately alkaline agent, in suspension or in solution, such as alkaline or alkaline-earth carbonate, basic oxides, for instance, MgO—, tertiary amines, such as pyridine, ensure the ideal reactional conditions and leads to a yield near that of theoretical. We prefer, however, the use of sodium carbonate.

The following nonlimiting examples illustrate the novel products of the invention, as well as several production methods.

EXAMPLE I 400 g. of chlorinated terphenyls containing 68.4 percent of chlorine, having a melting point of 210°–220° C., were heated under reflux conditions at 170° C. and at atmospheric pressure for 3 hours, with 1,200 cm.³ of monoethanolamine. After the reaction, the mixture was filtered and poured into 2 liters of water. A pulverulent product precipitated and was then agglomerated by heat, washed with water at 90° C., decanted and then dried under reduced pressure. 410 g. of a product melting at 70°–80° C. were obtained and this product contained:

| | |
|---|---|
| nitrogen | 5.45% |
| chlorine | 47.9% |
| OH | 6.65% |

EXAMPLE II 50 g. of chlorinated triphenylbenzenes containing 67.6 percent of chlorine, having a melting point of 340°–345° C., were heated under reflux conditions at 170° C. and at atmospheric pressure for 3 hours, with 500 cm.³ monoethanolamine. After the reaction, the mixture was filtered and poured into 500 cm.³ of water. A pulverulent product precipitated and was then washed with water and dried under reduced pressure. 48 g. of a product melting at 95°–105° C. were obtained and this product contained:

| | |
|---|---|
| nitrogen | 4.50% |
| chlorine | 50.8% |
| OH | 5.43% |

EXAMPLE III

A mixture formed by 400 cm.³ of ethylene diamine and 100 g. of chlorinated terphenyls containing 68.4 percent of chlorine, was heated under reflux conditions (117° C.) for 2½ hours. The reaction product was then poured into one liter of water. A pulverulent product precipitated and was then agglomerated by heat, washed with water at 90° C., decanted and then dried. After drying, 105 g. of a product melting at 72°–78 C. were obtained and the product contained:

| | |
|---|---|
| nitrogen | 10.95% |
| chlorine | 48.1% |

EXAMPLE IV

In a reactor provided with a stirrer were placed 35.6 parts by weight of perchlorinated terphenyl (0.054 mol), 135.0 parts by weight of metaphenylene diamine (1.254 mol), and 42.4 parts by weight of sodium carbonate (0.4 mol).

The reaction mixture was placed under nitrogen and heated under agitation to 210° C. After a 20-hour reaction, the mixture was cooled to 100° C. and added with 500 parts benzene. After cooling to room temperature, a residue, comprising the excess sodium carbonate, the sodium bicarbonate formed, and 0.1 mol of sodium chloride, formed by the condensation reaction, was filtered.

The filtrate was washed with 1 liter of hydrochloric acid 1.5 N. After decantation, the benzenic layer was washed with an aqueous solution of N/5 NaOH, then with water and finally the solvent was evaporated.

The solid product contained:

| | |
|---|---|
| nitrogen | 3.28% |
| chlorine | 57.5% |

EXAMPLE V

The operation was carried out as in example IV but with 0.05 mol of perchlorinated therpheynlbenzene (41.5 g.), 1.25 mol of diamino diphenylmethane (135 g.) and 0.4 mol of sodium carbonate (42.6 g.).

Thus, 0.1 mol of sodium chloride was formed and the solid product contained:

| | |
|---|---|
| nitrogen | 3% |
| chlorine | 68% |

We claim:

1. Polyaminated derivatives of polychlorinated polyphenylbenzenes higher than diphenyl, said derivatives having the following formula:

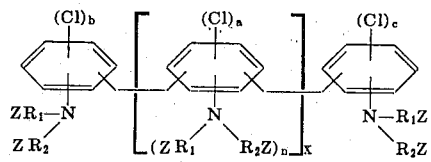

in which:
R₁Z and R₂Z are members selected from the group consisting of an atom of hydrogen and a group formed by a radical R₁ and R₂ and by a terminal group Z, said radicals R₁ and R₂ being selected from the group consisting of an alkyl radical having from two to eight carbon atoms and an aryl radical; said terminal group Z being a member selected from the group consisting of —OH, —NH₂, —CH₃, $x$ equals 1 to 2,
$n$ equals 1,
$a$, $b$, and $c$ represent the number of chlorine atoms fixed on each ring, $a$ equal to 1 to 3, $b$ and $c$ equal to 1 to 4.